(12) United States Patent
Nagano et al.

(10) Patent No.: US 9,777,694 B2
(45) Date of Patent: Oct. 3, 2017

(54) CONTROL DEVICE OF ENGINE

(71) Applicant: Mazda Motor Corporation, Aki-gun, Hiroshima (JP)

(72) Inventors: Takaaki Nagano, Higashihiroshima (JP); Masahisa Yamakawa, Hiroshima (JP); Takashi Youso, Hiroshima (JP); Kazuhiro Nagatsu, Hiroshima (JP); Atsushi Inoue, Aki-gun (JP); Kota Matsumoto, Aki-gun (JP); Takashi Kaminaga, Hiroshima (JP); Toru Miyamoto, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 146 days.

(21) Appl. No.: 14/951,924

(22) Filed: Nov. 25, 2015

(65) Prior Publication Data

US 2016/0201635 A1    Jul. 14, 2016

(30) Foreign Application Priority Data

Jan. 9, 2015 (JP) .................................. 2015-003372

(51) Int. Cl.
*B60T 7/12* (2006.01)
*F02P 5/04* (2006.01)
(Continued)

(52) U.S. Cl.
CPC .......... *F02P 5/045* (2013.01); *F02B 29/0418* (2013.01); *F02D 37/02* (2013.01); *F02D 41/005* (2013.01); *F02D 41/006* (2013.01); *F02D 41/0065* (2013.01); *F02D 41/06* (2013.01); *F02D 41/3023* (2013.01); *F02D 41/3035* (2013.01); *F02D 41/401* (2013.01);
(Continued)

(58) Field of Classification Search
CPC ............. F02B 19/1085; F02D 2700/02; F02D 2700/0217; F02D 1/16; F02D 41/401; Y02T 10/44
USPC ................ 701/103–105; 123/406.11, 406.47
See application file for complete search history.

(56) References Cited

U.S. PATENT DOCUMENTS

2001/0015192 A1* 8/2001 Urushihara ............ F02M 26/01
                                                                123/299
2012/0216775 A1    8/2012 Iwai et al.
(Continued)

FOREIGN PATENT DOCUMENTS

JP          2012172662 A    9/2012

*Primary Examiner* — John Kwon
(74) *Attorney, Agent, or Firm* — Alleman Hall Creasman & Tuttle LLP

(57) ABSTRACT

A control device of an engine is provided. The engine is operated at a high compression ratio, a geometric compression ratio of the engine being 14:1 or higher. The control device includes a fuel injection controller for controlling a fuel injector of the engine to start a fuel injection in a latter half of a compression stroke within an engine operating range where an engine speed is below a predetermined value and an engine load is above a predetermined value, and an ignition controller for controlling an ignition plug of the engine to retard an ignition timing when a timing for the fuel injection controller to start the fuel injection is on a retarding side of a predetermined timing, the ignition timing being retarded based on a retarding amount of the fuel injection start timing from the predetermined timing.

6 Claims, 5 Drawing Sheets

(51) Int. Cl.
*F02D 41/40* (2006.01)
*F02D 41/06* (2006.01)
*F02D 37/02* (2006.01)
*F02B 29/04* (2006.01)
*F02M 26/25* (2016.01)
*F02M 26/33* (2016.01)
*F02M 26/47* (2016.01)
*F02D 41/30* (2006.01)
*F02D 41/00* (2006.01)
*F02B 1/12* (2006.01)
*F02B 23/10* (2006.01)
*F02D 13/02* (2006.01)

(52) U.S. Cl.
CPC ............ *F02M 26/25* (2016.02); *F02M 26/33* (2016.02); *F02M 26/47* (2016.02); *F02B 1/12* (2013.01); *F02B 23/101* (2013.01); *F02B 29/0437* (2013.01); *F02D 13/0207* (2013.01); *F02D 13/0219* (2013.01); *F02D 13/0265* (2013.01); *F02D 41/0097* (2013.01); *F02D 41/402* (2013.01); *F02D 2250/38* (2013.01); *Y02T 10/44* (2013.01)

(56) References Cited

U.S. PATENT DOCUMENTS

| | | | |
|---|---|---|---|
| 2013/0179050 A1* | 7/2013 | Munshi | F02B 43/10 701/104 |
| 2014/0060489 A1* | 3/2014 | Iwai | F02B 23/101 123/478 |
| 2014/0060493 A1* | 3/2014 | Iwai | F02D 13/0273 123/478 |
| 2014/0069382 A1* | 3/2014 | Iwai | F02D 41/1446 123/406.47 |
| 2015/0114342 A1* | 4/2015 | Iwai | F02P 15/08 123/305 |
| 2017/0138314 A1* | 5/2017 | Fujimoto | F02D 41/0025 |

* cited by examiner

CONTROL DEVICE OF ENGINE

BACKGROUND

The present invention relates to a control device of an engine, and particularly to a control device of an engine which is operated at a high compression ratio.

Generally, for engines using gasoline or a fuel mainly composed of gasoline, a spark-ignition method in which ignition is performed by an ignition plug is broadly adopted. Recently, arts for performing compression self-ignition (specifically, premixed compression self-ignition referred to as HCCI (Homogeneous-Charge Compression Ignition)) within a predetermined operating range while using gasoline or a fuel mainly composed of gasoline by applying a high compression ratio (e.g., 17:1 or higher) as a geometric compression ratio of the engine are developed in view of improving fuel consumption.

One art regarding an engine which performs such compression self-ignition is disclosed in JP2012-172662A, for example. In the art of JP2012-172662A, the engine performs the compression self-ignition within a low engine load range and performs spark ignition within a high engine load range, and a period of time from a fuel injection start timing to an ignition timing is shortened by increasing a fuel pressure (i.e., a response time until ignition is shortened by retarding the fuel injection start timing), so as to suppress abnormal combustion, such as pre-ignition (a phenomenon in which mixture gas self-ignites before a normal combustion start timing triggered by spark ignition).

However, in the art of JP2012-172662A described above, the fuel pressure is increased to retard the fuel injection start timing as much as possible to the extent that the abnormal combustion (e.g., pre-ignition) does not occur; however in this case, the time period from the fuel injection until the ignition becomes excessively short, a sufficient mixing performance of the fuel (mixture gas) inside a combustion chamber cannot be secured, and smoke (soot) may be produced. Especially when an effective compression ratio is high, since it is desirable to greatly retard the fuel injection start timing to suppress pre-ignition, the time period from the fuel injection to the ignition becomes extremely short, and the possibility of producing smoke becomes high. Additionally, in view of the fuel consumption, when only the ignition timing is changed (i.e., an engine speed, an air-fuel ratio, etc., are not changed), it is desirable to apply a predetermined ignition timing with which a highest engine torque is obtained (generally referred to as "MBT" (Minimum advance for the Best Torque)); however, if such MBT is constantly applied, when the effective compression ratio becomes high, the time period from the fuel injection to the ignition becomes excessively short, and the possibility of producing smoke increases.

SUMMARY

The present invention is made in view of solving the issues of the conventional art described above, and aims to provide a control device of an engine, which can surely suppress both generation of abnormal combustion, such as pre-ignition, and production of smoke by applying a suitable fuel injection start timing and a suitable ignition timing.

According to an aspect of the present invention, a control device of an engine is provided. The engine is operated at a high compression ratio, a geometric compression ratio of the engine being 14:1 or higher. The control device includes a fuel injection controller for controlling a fuel injector of the engine to start a fuel injection in a latter half of a compression stroke within an engine operating range where an engine speed is below a predetermined value and an engine load is above a predetermined value, and an ignition controller for controlling an ignition plug of the engine to retard an ignition timing when a timing for the fuel injection controller to start the fuel injection on a retarding side of a predetermined timing, the ignition timing being retarded based on a retarding amount of the fuel injection start timing from the predetermined timing.

With this configuration, the fuel injection controller starts the fuel injection in the latter half of the compression stroke and, when the timing for the fuel injection controller to start the fuel injection is on the retarding side of the predetermined timing, the ignition controller retards the ignition timing based on the retarding amount from the predetermined timing. Thus, the suitable fuel injection start timing is applied, and pre-ignition can be suppressed. Further, the suitable ignition timing is applied, and production of smoke can be suppressed.

The fuel injection controller preferably retards the fuel injection start timing as an effective compression ratio increases, so as to shorten a period of time from the start of the fuel injection to a top dead center on the compression stroke.

With this configuration, the fuel injection start timing is retarded as the effective compression ratio increases, so as to shorten the period of time from the start of the fuel injection to the top dead center on the compression stroke. Thus, a cause of pre-ignition, a chemical reaction of mixture gas, can suitably be suppressed from progressing between the fuel injection and the ignition, and the pre-ignition can effectively be suppressed.

When the fuel injection start timing of the fuel injection controller is on the retarding side of the predetermined timing, the ignition controller preferably sets the ignition timing based on the fuel injection start timing of the fuel injection controller and a mixture gas forming period of time from the fuel injection by the fuel injector until a mixture gas is formed around the ignition plug.

With this configuration, the ignition timing is set based on the mixture gas forming time period from the fuel injection by the fuel injector until the mixture gas is formed around the ignition plug. Thus, a mixing performance of the mixture gas inside a combustion chamber can suitably be secured, and the smoke production can effectively be suppressed.

The engine preferably has a piston formed with a downward cavity at a top part, and the fuel injector preferably injects the fuel toward the cavity of the piston. The mixture gas forming time period is preferably defined based on a period of time from the fuel injection by the fuel injector until the mixture gas including the injected fuel reaches the ignition plug via the cavity.

With this configuration, the ignition timing is set based on the suitable mixture gas forming time period. Thus, the smoke production can be suppressed more effectively. Further, with the configuration of injecting the fuel toward the cavity of the piston to reach the ignition plug via the cavity as described above and then ignite, the mixture gas forming time period can be shortened and combustion can be stabilized.

The control device preferably also includes a fuel pressure controller for increasing a pressure of the fuel as the engine load increases, so as to apply, as the ignition timing of the ignition controller, a predetermined ignition timing with which a highest engine torque is obtained, when the fuel injection start timing of the fuel injection controller is on an advancing side of the predetermined timing and only the ignition timing is changed.

With this configuration, when the fuel injection start timing of the fuel injection controller is on the advancing side of the predetermined timing, the pressure of the fuel is increased as the engine load increases so that the predetermined ignition timing with which the highest engine torque is obtained (MBT) is applied as the ignition timing when only the ignition timing is changed. Thus, a suitable fuel consumption can be secured.

The fuel injection controller preferably sets the fuel injection start timing to avoid pre-ignition in which mixture gas self-ignites before a normal combustion start timing triggered by spark ignition.

With this configuration, the suitable fuel injection start timing is applied. Thus, pre-ignition can effectively be suppressed.

DETAILED DESCRIPTION OF EMBODIMENT

Hereinafter, a control device of an engine according to one embodiment of the present invention is described with reference to the appended drawings.

Figure 1:
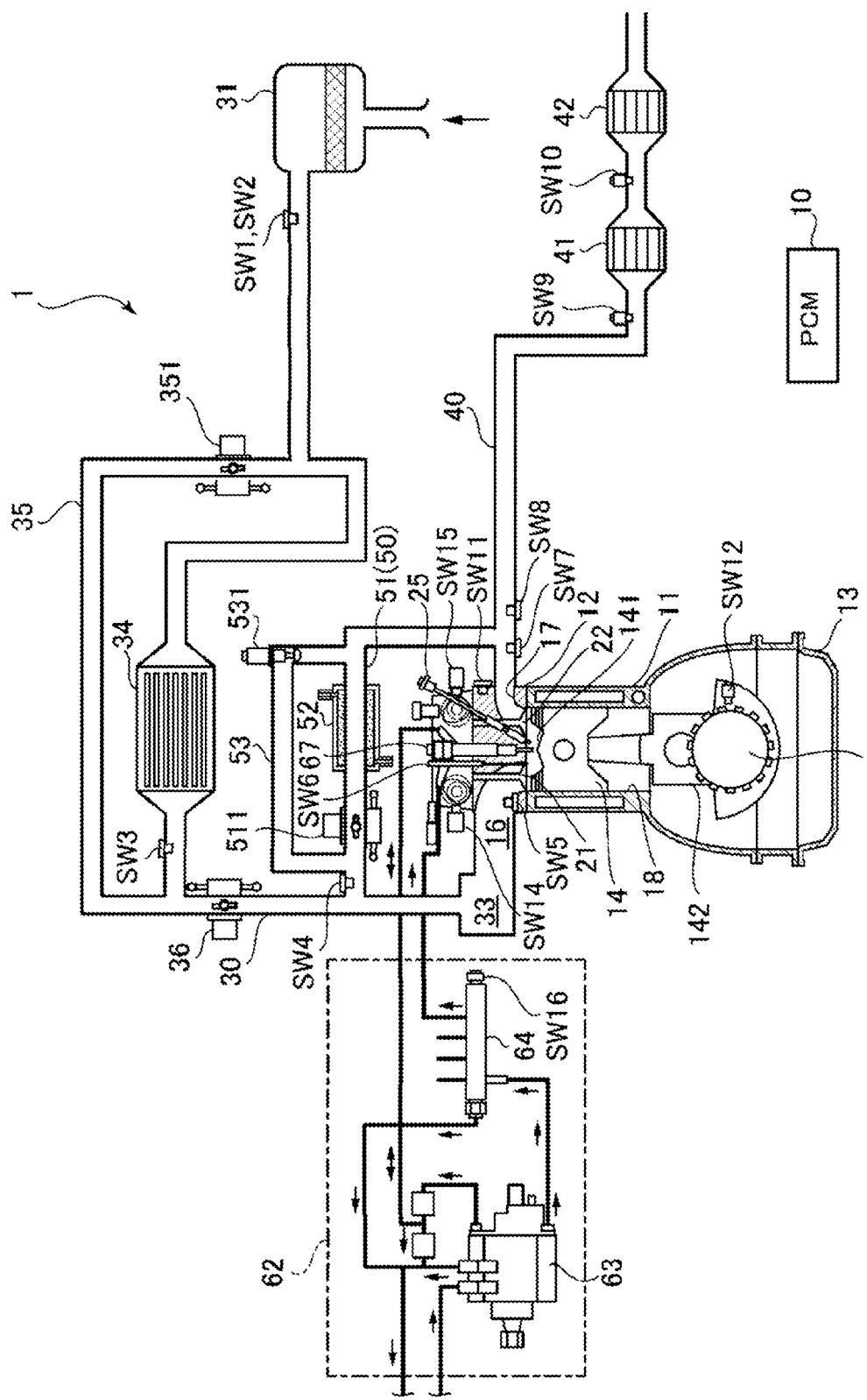
FIG. 1 is a schematic diagram of an engine to which a control device according to one embodiment of the present invention is applied.
Figure 2:
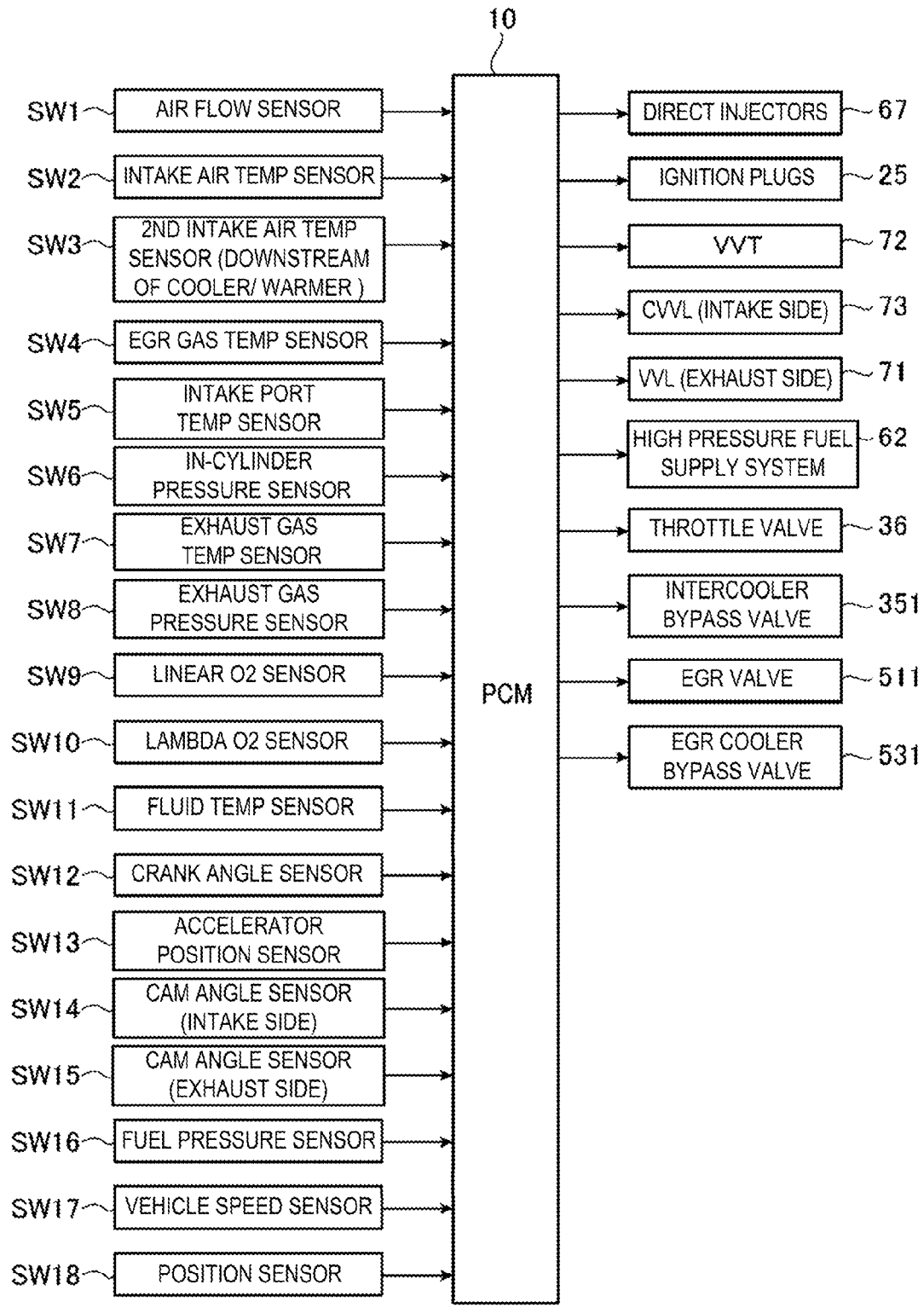
FIG. 2 is a block diagram illustrating an electric configuration relating to the control device of the engine according to the embodiment of the present invention.

FIG. 1 is a schematic diagram of the engine (1 to which the control device according to one embodiment of the present invention is applied. FIG. 2 is a block diagram illustrating an electric configuration relating to the control device of the engine according to the embodiment of the present invention.

Figure 3:
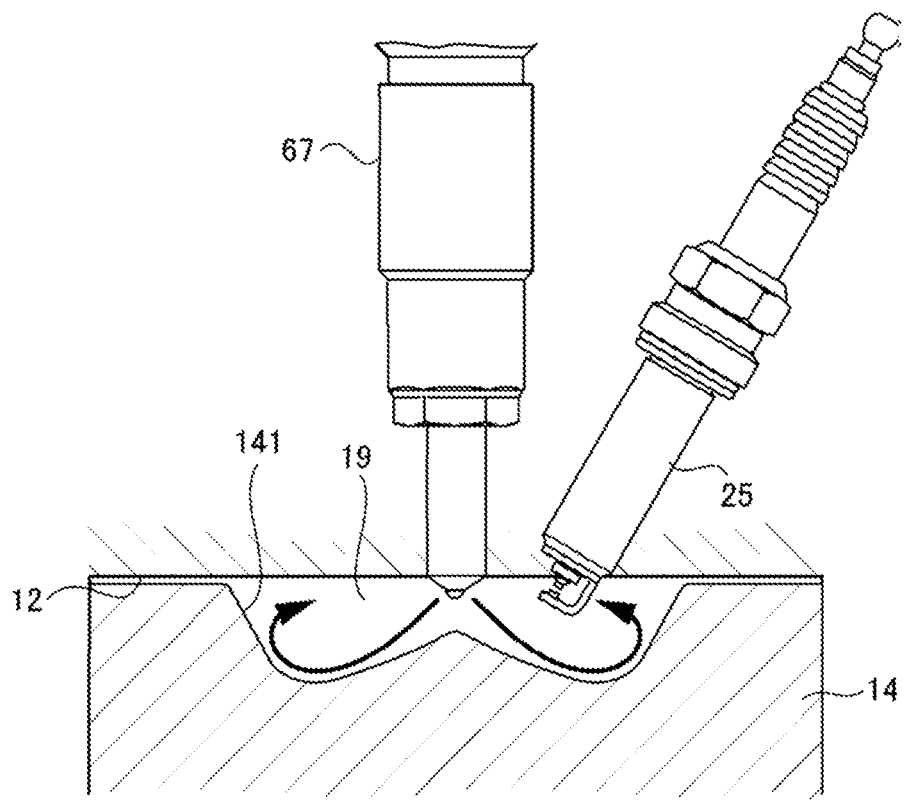
FIG. 3 is a cross-sectional view illustrating a combustion chamber of the engine according to the embodiment of the present invention in an enlarged manner.

The engine 1 is a spark-ignition gasoline engine mounted to a vehicle and supplied with fuel containing at least gasoline. The engine 1 includes a cylinder block 11 provided with a plurality of cylinders 18 (note that although only one cylinder is illustrated in FIG. 1, for example, four cylinders are linearly provided in this embodiment), a cylinder head 12 disposed on the cylinder block 11, and an oil pan 13 disposed below the cylinder block 11 and storing a lubricant. Pistons 14 coupled to a crankshaft 15 via respective connecting rods 142 are reciprocatably fitted into the cylinders 18. As illustrated in FIG. 3 in an enlarged manner, a cavity 141 having a shape similar to a reentrant shape, generally used in a diesel engine, is formed on a top face of each piston 14. When the piston 14 is at a position near a top dead center on compression stroke (compression top dead center), the cavity 141 faces toward a fuel injector 67 described later. The cylinder head 12, the cylinders 18, and the pistons 14 each formed with the cavity 141 partition combustion chambers 19. Note that the shape of each combustion chamber 19 is not limited to the shape in the drawings. For example, the shape of the cavity 141, the shape of the top surface of the piston 14, and the shape of a ceiling part of the combustion chamber 19 may suitably be changed.

A geometric compression ratio of the engine 1 is set comparatively high as 15:1 or higher so as to improve theoretical thermal efficiency and stabilize compression-ignition combustion (described later), etc. For example, the geometric compression ratio may suitably be set within a range between about 15:1 and 20:1.

In the cylinder head 12, each of the cylinders 18 is formed with an intake port 16 and an exhaust port 17, and provided with an intake valve 21 for opening and closing the intake port 16 on the combustion chamber 19 side and an exhaust valve 22 for opening and closing the exhaust port 17 on the combustion chamber 19 side.

In a valve train system of the engine 1 for operating the intake and exhaust valves 21 and 22, for example, a hydraulically-actuated variable valve mechanism (see FIG. 2; hereinafter, may be referred to as the variable valve lift (VVL)) 71 for switching an operation mode of the exhaust valve 22 between a normal mode and a special mode is provided on an exhaust side. The VVL 71 (a specific configuration thereof is not illustrated) includes two kinds of cams and a lost motion mechanism. The two kinds of cams include a first cam and a second cam having different cam profiles in which the first cam has one cam nose and the second cam has two cam noses. The lost motion mechanism selectively transmits an operating state of one of the first and second cams to the exhaust valve 22. While the lost motion mechanism transmits the operating state of the first cam to the exhaust valve 22, the exhaust valve 22 operates in the normal mode where it opens only once during exhaust stroke. On the other hand, while the lost motion mechanism transmits the operating state of the second cam to the exhaust valve 22, the exhaust valve 22 operates in the special mode, which is a so-called exhaust open-twice control, where it opens once during the exhaust stroke and once again during an intake stroke. The normal and special modes of the VVL 71 are switched therebetween according to an operating state of the engine. Specifically, the special mode is utilized for a control related to an internal exhaust gas recirculation (EGR).

Hereinafter, the process of operating the VVL 71 in the normal mode where the exhaust open-twice control is not performed may be referred to as "turning the VVL 71 off," and the process of operating the VVL 71 in the special mode where the exhaust open-twice control is performed may be referred to as "turning the VVL 71 on." Note that in enabling the switch between the normal mode and the special mode, an electromagnetic valve train system for operating the exhaust valve 22 by an electromagnetic actuator may be adopted. Further, the execution of the internal EGR is not limited to being achieved only by the exhaust open-twice control. For example, the internal EGR control may be performed by an intake open-twice control in which the intake valve 21 opens twice, or an internal EGR control may be performed in which burned gas is left inside the cylinder 18 by providing a negative overlap period in which both the intake and exhaust valves 21 and 22 are closed on one of the exhaust stroke and the intake stroke.

While the valve train system on the exhaust side is provided with the VVL 71, the intake side, as illustrated in FIG. 2, is provided with a phase variable mechanism (hereinafter, may be referred as the variable valve timing (VVT)) 72 for varying a rotational phase of an intake camshaft with respect to the crankshaft 15, and a lift variable mechanism (hereinafter, may be referred to as the continuously variable valve lift (CVVL)) 73 for continuously varying a lift of the intake valve 21. For the VVT 72, although specific structure is not illustrated, any one of known structures of a hydraulic type, an electromagnetic type, and a mechanical type may suitably be adopted. Also for the CVVL 73, although a specific structure is not illustrated, any one of various known structures may be adopted. The VVT 72 and the CVVL 73 can change each of open and close timings and the lift of the intake valve 21 individually.

Further in the cylinder head 12, the fuel injector 67 for injecting the fuel directly into the cylinder 18 is attached for each cylinder 18. As illustrated in FIG. 3 in an enlarged manner, the fuel injector 67 is arranged so that a nozzle hole is oriented toward the inside of the combustion chamber 19 from a center portion of the ceiling surface of the combustion chamber 19. The fuel injector 67 injects the fuel directly into the combustion chamber 19 by an amount defined according to the operating state of the engine 1, at an injection timing set according to the operating state of the engine 1. In this embodiment, the fuel injector 67 (a specific configuration thereof is not illustrated) is a multi-hole injector formed with a plurality of nozzle holes. Thus, the fuel injector 67 injects the fuel so that the fuel spray spreads radially from the center portion of the combustion chamber 19.

As indicated by the arrows in FIG. 3, when the fuel is injected to spread radially from the center portion of the combustion chamber 19 at a timing when the piston 14 is near the compression top dead center, the fuel spray flows along a wall surface of the cavity 141 formed on the piston top face, to reach around an ignition plug 25 described later. Thus, a period of time from the fuel injection by the fuel injector 67 until mixture gas including the injected fuel reaches the ignition plug 25 via the cavity 141 corresponds to a mixture gas forming period of time. Further, it may be said that the cavity 141 is formed to contain therewithin the fuel spray injected at the timing when the piston 14 is near the compression top dead center. After the fuel is injected, the combination of the multi-hole fuel injector 67 and the cavity 141 is advantageous for shortening the mixture gas forming time period and the combustion period. Note that the fuel injector 67 is not limited to the multi-hole injector and may be an outward opening type injector.

Note that the mixture gas forming time period described above can be obtained by equations defined based on the shape of the cavity 141, a position of the ignition plug 25, etc., according to a fuel injection start timing (in other words, a position of the piston 14 when the fuel injection is started), a pressure of the fuel, etc. Alternatively, the mixture gas forming time period can be obtained based on experiments and simulations executed while the fuel injection start timing, the fuel pressure, etc., are variously changed.

A fuel tank (not illustrated) and the fuel injectors 67 are coupled to each other by a fuel supply path. A fuel supply system 62 having a fuel pump 63 and a common rail 64 and for supplying the fuel to each of the fuel injectors 67 at a comparatively high fuel pressure is provided within the fuel supply path. The fuel pump 63 pumps the fuel from the fuel tank to the common rail 64, and the common rail 64 can accumulate the pumped fuel at a comparatively high fuel pressure. By opening the nozzle holes of the fuel injector 67, the fuel accumulated in the common rail 64 is injected from the nozzle holes of the fuel injector 67. Here, the fuel pump 63 is a plunger type pump (not illustrated) and is operated by the engine 1. The fuel supply system 62 including the engine-operated pump enables supply of the fuel to the fuel injector 67 at a high fuel pressure of 30 MPa or higher. The fuel pressure may be set, up to about 120 MPa. As described later, the pressure of the fuel supplied to the fuel injector 67 is changed according to the operating state of the engine 1. Note that the fuel supply system 62 is not limited to have the above configuration. The fuel supply system 62 constitutes a fuel pressure setting mechanism.

Further, as illustrated in FIG. 3, the ignition plug 25 for igniting the mixture gas inside the combustion chamber 19 is attached to the cylinder head 12. In this embodiment, the ignition plug 25 is arranged penetrating the cylinder head 12 so as to extend obliquely downward. As illustrated in FIG. 3, the ignition plug 25 is arranged so that a tip thereof is oriented toward the inside of the cavity 141 of the piston 14 when it is at the compression top dead center. More specifically, the ignition plug 25 is arranged so that the tip is both above and near an edge portion of the cavity 141.

On one side surface of the engine 1, as illustrated in FIG. 1, an intake passage 30 is connected to communicate with the intake port 16 of each cylinder 18. On the other side surface of the engine 1, an exhaust passage 40 is connected to guide out the burned gas (exhaust gas) discharged from each of the combustion chambers 19 of the cylinders 18.

An air cleaner 31 for filtrating intake air is disposed in an upstream end part of the intake passage 30. A surge tank 33 is disposed near a downstream end of the intake passage 30. Part of the intake passage 30 downstream of the surge tank 33 is branched into independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an amount of intake air to be supplied to the cylinders 18 are disposed between the air cleaner 31 and the surge tank 33 in the intake passage 30. Moreover, an intercooler bypass passage 35 for bypassing the intercooler/warmer 34 is connected with the intake passage 30, and an intercooler bypass valve 351 for adjusting an air flow rate within the passage 35 is disposed within the intercooler bypass passage 35. A temperature of fresh air introduced into the cylinder 18 can be controlled by adjusting a ratio of a flow rate within the intercooler bypass passage 35 with a flow rate within the intercooler/warmer 34 through controlling an opening of the intercooler bypass valve 351.

An upstream part of the exhaust passage 40 includes an exhaust manifold. The exhaust manifold has independent passages branched toward the respective cylinders 18 and connected with respective external ends of the exhaust ports 17, and a manifold section where the independent passages merge together. Within part of the exhaust passage 40 on the downstream side of the exhaust manifold, a direct catalyst 41 and an underfoot catalyst 42 are connected as an exhaust emission control system for purifying hazardous components within the exhaust gas. Each of the direct catalyst 41 and the underfoot catalyst 42 includes a cylindrical case and, for example, a three-way catalyst disposed in a flow path within the case.

Part of the intake passage 30 between the surge tank 33 and the throttle valve 36 is connected with part of the exhaust passage 40 on the upstream side of the direct catalyst 41 via an EGR passage 50 for circulating part of the exhaust gas (EGR gas) back to the intake passage 30. The EGR passage 50 includes a main passage 51 provided with an EGR cooler 52 for cooling the exhaust gas by an engine coolant, and an EGR cooler bypass passage 53 for bypassing the EGR cooler 52. An EGR valve 511 for adjusting a circulation amount of the exhaust gas for the intake passage 30 is disposed within the main passage 51. An EGR cooler bypass valve 531 for adjusting a flow rate of the exhaust gas flowing through the EGR cooler bypass passage 53 is disposed within the EGR cooler bypass passage 53.

The engine 1 with the configuration described as above is controlled by a powertrain control module 10 (hereinafter, may be referred to as the PCM). The PCM 10 is comprised of a microprocessor including a CPU, a memory, a counter timer group, an interface, and paths for connecting these units. The PCM 10 constitutes a controller.

As illustrated in FIGS. 1 and 2, detection signals of various kinds of sensors SW1 to SW18 are inputted to the PCM 10. The various kinds of sensors include the following sensors: an air flow sensor SW1 for detecting the flow rate of the fresh air and an intake air temperature sensor SW2 for detecting the temperature of the fresh air, both disposed downstream of the air cleaner 31; a second intake air temperature sensor SW3 disposed downstream of the intercooler/warmer 34 and for detecting the temperature of the fresh air after passing through the intercooler/warmer 34; an EGR gas temperature sensor SW4 disposed near a connecting part of the EGR passage 50 with the intake passage 30 and for detecting a temperature of external EGR gas; an intake port temperature sensor SW5 attached to the intake port 16 and for detecting the temperature of the intake air immediately before flowing into the cylinder 18; an in-cylinder pressure sensor SW6 attached to the cylinder head 12 and for detecting the pressure inside the cylinder 18; an exhaust gas temperature sensor SW7 and an exhaust gas pressure sensor SW8 disposed near a connecting part of the exhaust passage 40 with the EGR passage 50 and for detecting the temperature and the pressure of the exhaust gas, respectively; a linear O2 sensor SW9 disposed upstream of the direct catalyst 41 and for detecting an oxygen concentration within the exhaust gas; a lambda O2 sensor SW10 disposed between the direct catalyst 41 and the underfoot catalyst 42 and for detecting the oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14; an exhaust cam angle sensor SW15; a fuel pressure sensor SW16 attached to the common rail 64 of the fuel supply system 62 and for detecting the fuel pressure supplied to the fuel injector 67; a vehicle speed sensor SW17 for detecting a vehicle speed; and a position sensor SW18 for detecting a position of a shift lever.

By performing various kinds of operations based on these detection signals, the PCM 10 determines the state of the engine 1 and the state of the vehicle, and outputs control signals to the fuel injectors 67, the ignition plugs 25, the VVT 72 and the CVVL 73 on the intake side, the VVL 71 on the exhaust side, the fuel supply system 62, a power generator, and the actuators of the various kinds of valves (the throttle valve 36, the intercooler bypass valve 351, the EGR valve 511, and the EGR cooler bypass valve 531) according to the determined state. In this manner, the PCM 10 operates the engine 1.

Note that although described later in detail, the PCM 10 may be referred to as "the control device of the engine" and functions as "a fuel injection controller" for controlling the timing of the fuel injection performed by the fuel injector 67, "an ignition controller" for controlling the ignition timing of the ignition plug 25, and "a fuel pressure controller" for controlling, by the fuel supply system 62, the pressure of the fuel injected by the fuel injector 67.

Figure 4:
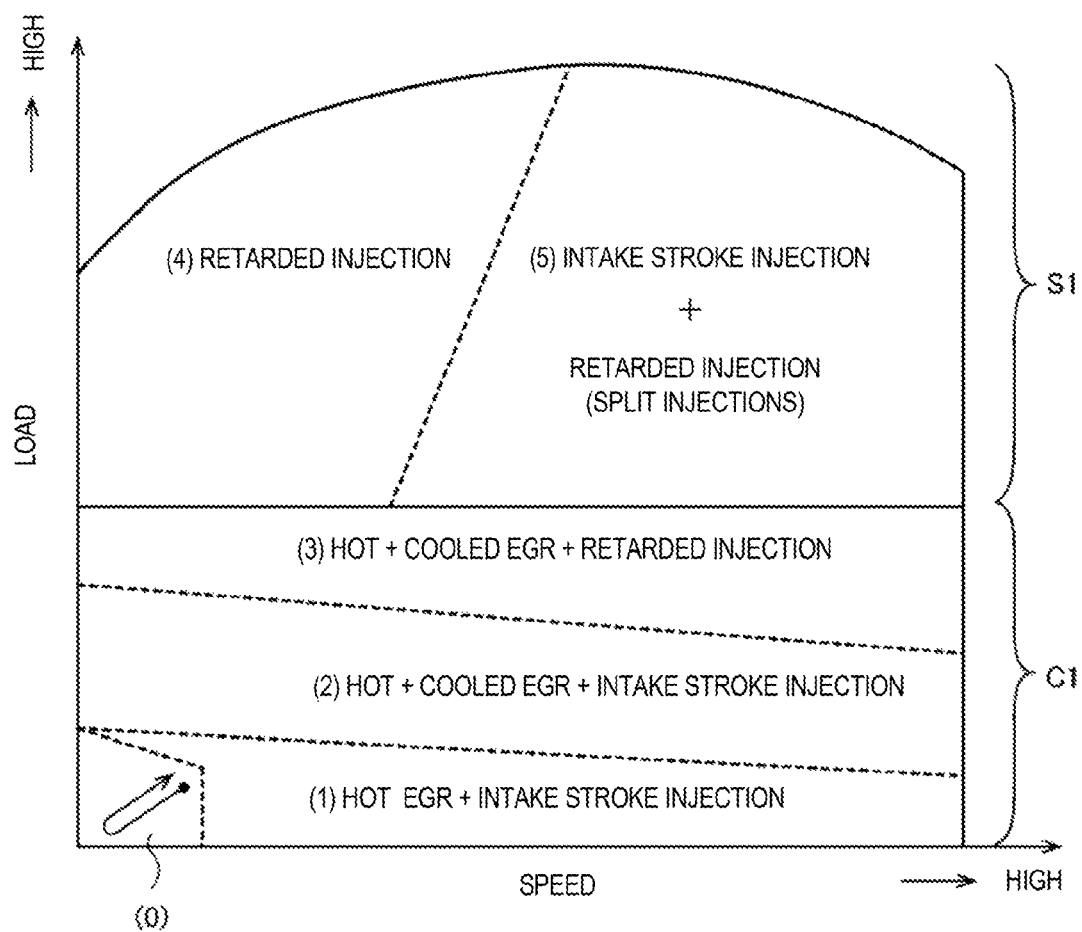
FIG. 4 is a view illustrating an operating range of the engine according to the embodiment of the present invention.

FIG. 4 illustrates one example of an operating range of the engine 1 of this embodiment. Within a low engine load range where the engine load is relatively low, the engine 1 performs compression-ignition combustion in which combustion is generated by compression self-ignition without performing the ignition by the ignition plug 25, so as to improve a fuel consumption and exhaust emission performance. However, with the compression-ignition combustion, the speed of the combustion increases as the engine load increases, resulting in excessively sharp combustion and causing a problem of combustion noises, etc. Therefore, with the engine 1, within a high engine load range where the engine load is relatively high, the compression-ignition combustion is suspended and switched to spark-ignition combustion using the ignition plug 25. As described above, the engine 1 switches a combustion mode according to the operating state of the engine 1, particularly according to the load of the engine 1, between a CI (Compression-Ignition) mode where the compression-ignition combustion is performed and an SI (Spark-Ignition) mode where the spark-ignition combustion is performed. Note that the boundary of switching the mode is not limited to the example in the illustrated example.

The CI mode is divided into three ranges according to the level of the engine load. Specifically, within a lowest engine load range (1) in the CI mode, EGR gas with a relatively high temperature (hereinafter, may also be referred to as hot EGR gas) is introduced into the cylinder 18 to improve ignitability and stability of the compression-ignition combustion. This operation is performed by turning the VVL 71 on to perform the exhaust open-twice control in which the exhaust valve 22 is opened during the intake stroke. The introduction of the hot EGR gas increases a compression-end temperature inside the cylinder 18, and is advantageous in improving the ignitability and stability of the compression-ignition combustion within the range (1) corresponding to a light load state. Moreover, within the range (1), the fuel injector 67 injects the fuel into the cylinder 18 at least in a period from the intake stroke to a middle stage of the compression stroke, so as to form a homogenous lean mixture gas. An air excess ratio λ of the mixture gas may be set to 2.4 or higher, and in this manner, generation of RawNOx can be reduced and the exhaust emission performance can be improved. Thus, the lean mixture gas is compressed to self-ignite near the compression top dead center.

Although described later in detail, a high engine load part of the range (1), specifically, within a part including the boundary between the ranges (1) and (2), although the fuel is injected into the cylinder 18 at least in the period from the intake stroke to the middle stage of the compression stroke, the air-fuel ratio of the mixture gas is set to a theoretical air-fuel ratio (λ≈1). By setting to the theoretical air-fuel ratio, the three-way catalyst becomes useable and a control performed when switching between the SI and CI modes is simplified, which contribute in extending the CI mode to the high engine load side.

In the CI mode, within the range (2) where the engine load is higher than the range (1), similar to the high engine load part of the range (1), the fuel is injected into the cylinder 18 to form the homogeneous mixture gas at the theoretical air-fuel ratio (1) at least in the period from the intake stroke to the middle stage of the compression stroke.

Moreover, within the range (2), the temperature inside the cylinder 18 naturally increases due to the increase of the engine load. Therefore, the hot EGR gas amount is reduced to avoid pre-ignition. This operation is performed by adjusting an internal EGR gas amount for being introduced into the cylinder 18.

Furthermore, within the range (2), the EGR gas with a relatively low temperature (hereinafter, may also be referred to as cooled EGR gas) is introduced into the cylinder 18. By introducing the hot EGR gas and the cooled EGR into the cylinder 18 at a suitable ratio, the compression-end temperature inside the cylinder 18 can suitably be adjusted, the sharp combustion can be avoided while securing the ignitability of the compression ignition, and the compression-ignition combustion can be stabilized. Note that a ratio of the EGR gas that is the sum of the hot EGR gas and the cooled EGR gas and to be introduced into the cylinder 18 (EGR rate) is set to a highest possible rate under a condition that the air excess ratio of the mixture gas is set to $\lambda \approx 1$. Therefore, within the range (2), the fuel injection amount increases as the engine load increases, and as a result, the EGR rate gradually decreases.

Within a range (3) including a boundary of switching between the CI mode and the SI mode and being a highest engine load range in the CI mode, the compression-end temperature inside the cylinder 18 becomes even higher. Therefore, if the fuel is injected into the cylinder 18 in the period from the intake stroke to the middle stage of the compression stroke as the ranges (1) and (2), abnormal combustion (e.g., pre-ignition) may occur. On the other hand, if a large amount of the cooled EGR gas with the low temperature is introduced to decrease the compression-end temperature inside the cylinder, the ignitability of the compression-ignition will degrade. In other words, the compression-ignition combustion cannot be performed stably by simply controlling the temperature inside the cylinder 18 (in-cylinder temperature control). Therefore, within the range (3), by adjusting the fuel injection mode in addition to the in-cylinder temperature control, the compression-ignition combustion can be stabilized while avoiding abnormal combustion (e.g., pre-ignition). Specifically, in the adjusted fuel injection mode, the fuel is injected into the cylinder 18 at least in a period from a late stage of the compression stroke to an early stage of expansion stroke (hereinafter, referred to as the retard period) at a significantly higher fuel pressure compared to the conventional mode. By such a high pressure retarded injection, the compression-ignition combustion can be stabilized while avoiding the abnormal combustion within the range (3). The details of the high pressure retarded injection will be described later.

Within the range (3), similar to the range (2), the hot EGR gas and the cooled EGR are introduced into the cylinder 18 at a suitable ratio. Thus, the compression-end temperature inside the cylinder 18 can suitably be adjusted and the compression-ignition combustion can be stabilized.

While the CI mode is divided into the three ranges according to the level of the engine load, the SI mode is divided into two ranges of the ranges (4) and (5) according to the level of the engine speed. Each of the ranges (4) and (5) corresponds to a range where the engine load is higher than the ranges (1) to (3) described above, specifically, corresponds to a range where the engine load is higher than a predetermined value. In the example of FIG. 4, when the operating range of the engine 1 is divided into two ranges of low and high speed ranges, the range (4) corresponds to the low speed range and the range (5) corresponds to the high speed range. In other words, the range (4) corresponds to a low engine speed range where the engine speed is below a predetermined value, and the range (5) corresponds to a high engine speed range where the engine speed is above the predetermined speed. Note that within the operating range of FIG. 4, the boundary between the ranges (4) and (5) extends in the engine load directions and inclines to one of the speed directions; however, the boundary between the ranges (4) and (5) is not limited to the illustrated example.

In each of the ranges (4) and (5), the mixture gas is set to achieve the theoretical air-fuel ratio ($\lambda \approx 1$) similar to the ranges (2) and (3). Therefore, the air-fuel ratio of the mixture gas is fixed to the theoretical air-fuel ratio ($\lambda \approx 1$) across the boundary between the CI and SI modes. By this setting, the three-way catalyst becomes useable. Moreover, in the ranges (4) and (5), an opening of the EGR valve 511 is adjusted while the throttle valve 36 is basically fully opened, so as to adjust the amounts of fresh air and the external EGR gas to be introduced into the cylinder 18. The adjustment of the gas ratio introduced into the cylinder 18 as above can reduce a pumping loss, and by introducing a large amount of the EGR gas into the cylinder 18, the combustion temperature of the spark-ignition combustion can be suppressed to be low and a cooling loss can also be reduced. Within the ranges (4) and (5), the external EGR gas cooled mainly through the EGR cooler 52 is introduced into the cylinder 18, which is effective in avoiding the abnormal combustion and also suppressing the generation of RawNOx. The openings of the EGR valve 511 and the EGR cooler bypass valve 531 are reduced as the engine load increases. Here, the opening of the EGR valve 511 is relatively larger than that of the EGR cooler bypass valve 531, i.e., the amount of the cooled EGR gas is larger than the hot EGR gas. Further, due to the engine load increase, the EGR cooler bypass valve 531 reaches a fully closed state earlier than the EGR valve 511. Note that within a full engine load range, the EGR valve 511 is fully closed to cancel the external EGR.

The geometric compression ratio of the engine 1 is, as described above, set to 15:1 or higher (e.g., 18:1). Since a high compression ratio increases the compression-end temperature and a compression-end pressure inside the cylinder, it is advantageous in stabilizing the compression-ignition combustion in the CI mode, especially within the low engine load range of the CI mode (e.g., the range (1)). Whereas, in the SI mode corresponding to the high engine load range, such a high compression ratio causes a problem in the engine 1 that abnormal combustion (e.g., pre-ignition and knocking) easily occurs.

Thus, with the engine 1, within the ranges (4) and (5) of the SI mode, the high pressure retarded injection described above is performed to avoid the abnormal combustion. Specifically, within the range (4), only the high pressure retarded injection in which the fuel is injected into the cylinder 18 at a high fuel pressure (e.g., at least 30 MPa or higher) in the retard period from the late stage of the compression stroke to the early stage of the expansion stroke is performed. On the other hand, within the range (5), part of the fuel for the injection may be injected into the cylinder 18 in an intake stroke period in which the intake valve 21 is opened, and the rest of the fuel is injected into the cylinder 18 in the retard period. In other words, split injections of the fuel are performed within the range (5). In this embodiment, the intake stroke period in which the intake valve 21 is opened means a period that is not defined based on the position of the piston, but based on the opening and closing of the intake valve. Therefore, the intake stroke in this embodiment may be offset from the timing for the piston to reach a bottom dead center of the intake stroke, depending on the close timing of the intake valve 21 that is changed by the VVT 72 and the CVVL 73.

Figure 5:
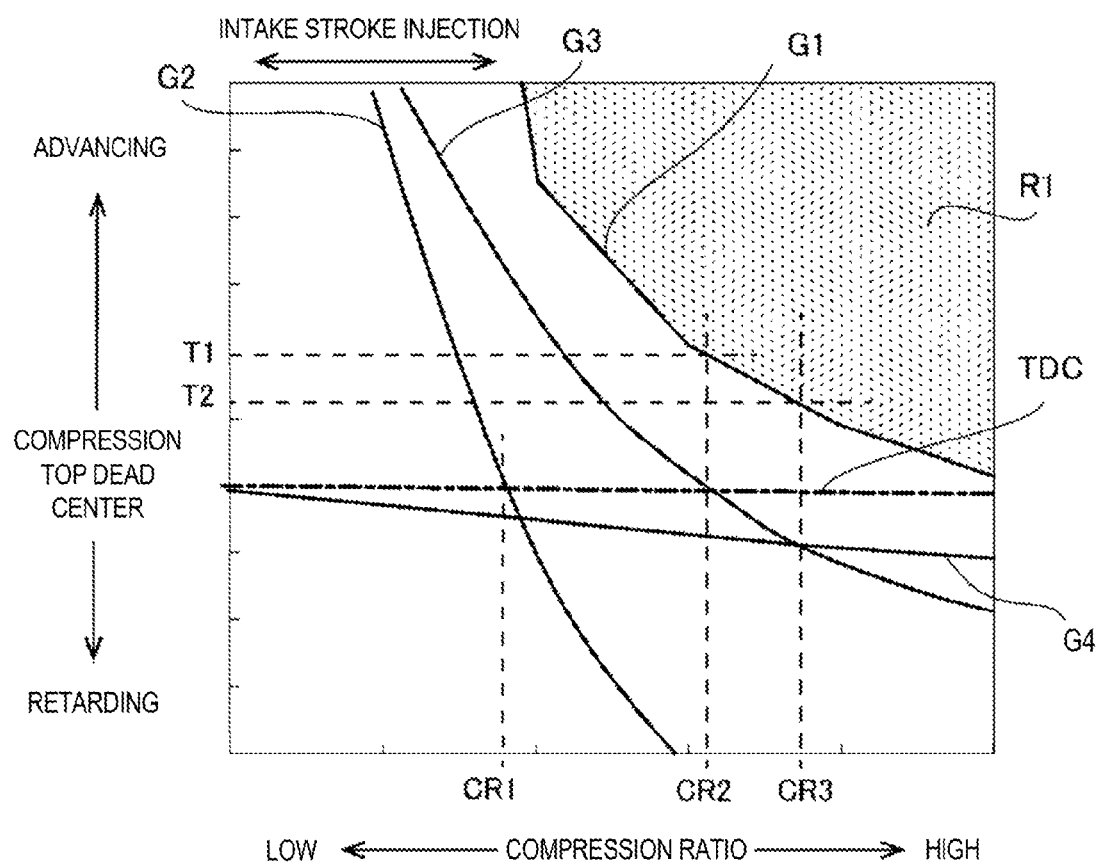
FIG. 5 is a view illustrating a fuel injection start timing and an ignition timing applied within a low-engine-speed and high-engine-load range in the embodiment of the present invention.

Next, a control method according to this embodiment is described with reference to FIG. 5. FIG. 5 is a view illustrating the fuel injection start timing and the ignition timing applied within a low-engine-speed and high-engine-load range (e.g., the range (4) in FIG. 4) in the embodiment of the present invention. In FIG. 5, the horizontal axis indicates the effective compression ratio in a manner that the effective compression ratio decreases as it moves leftward, and increases as it moves rightward. A range of the effective compression ratio in this horizontal axis is from 14:1 to 19:1. Further in FIG. 5, the vertical axis indicates one of the fuel injection timing and the ignition timing with respect to the compression top dead center (hereinafter, suitably denoted with "TDC") in a manner that the upward direction indicates an advancing side from the compression top dead center and the downward direction indicates a retarding side from the compression top dead center.

A range R1 in FIG. 5 indicates a range where pre-ignition occurs when the fuel injection is started, the pre-ignition in which the mixture gas self-ignites before a normal combustion start timing triggered by spark ignition. Based on the range R1, it can be understood that the range where the pre-ignition occurs extends to the retarding side when the effective compression ratio increases. This result indicates that when the effective compression ratio is increased, to suppress the pre-ignition, the fuel injection start timing needs to be retarded, i.e., the time period from the fuel injection start timing to the compression top dead center TDC needs to be shortened.

In this embodiment, the PCM 10 controls the fuel injector 67 to start the fuel injection according to a graph G1 corresponding to the boundary of the range R1 (corresponding to a limit of the fuel injection start timing for not causing the pre-ignition), so as to suppress the pre-ignition. Specifically, the PCM 10 applies a timing on the graph G1 corresponding to a current effective compression ratio (that can be calculated by a known method based on a volume inside the cylinder, a volume inside the head, the valve timing, etc.), as the fuel injection start timing of the fuel injector 67. In this case, the PCM 10 suppresses the pre-ignition by retarding the fuel injection start timing so that the time period from the fuel injection start timing to the compression top dead center TDC becomes shorter as the effective compression ratio increases. Note that in a situation where the effective compression ratio is significantly high, the fuel injection is started immediately before the compression top dead center TDC. In this case, the total amount of fuel for the injection cannot be injected on the compression stroke, and the fuel injection continues even on the expansion stroke which is after the compression stroke.

On the other hand, graphs G2 and G3 in FIG. 5 indicate ignition timings when the above-described mixture gas forming time period (see FIG. 3) from the fuel injection by the fuel injector 67 until the mixture gas is formed around the ignition plug 25 is applied to the fuel injection start timing according to the graph G1. In other words, each of the ignition timings indicated by the graphs G2 and G3 corresponds to such an ignition timing that in a case where the ignition is performed at this ignition timing after the fuel injection is started according to the graph G1, a sufficient period of time for obtaining suitable mixing performance of the mixture gas inside the combustion chamber can be secured and smoke is not produced. Specifically, the graph G2 indicates a limitation of the ignition timing for not producing smoke when a comparatively low fuel pressure (e.g., 40 MPa) is used. More specifically, the graph G2 indicates that smoke may be produced if the ignition timing is advanced from the graph G2, and smoke is not produced if the ignition timing is retarded from the graph G2. On the other hand, the graph G3 indicates a limitation of the ignition timing for not producing smoke when a comparatively high fuel pressure (e.g., 120 MPa) is used. More specifically, the graph G3 indicates that smoke may be produced if the ignition timing is advanced from the graph G3, and smoke is not produced if the ignition timing is retarded from the graph G3. Based on the graphs G2 and G3, it can be understood that the timing at which the ignition can be performed without causing smoke shifts to the advancing side when the fuel pressure is increased. Such a shift occurs because when the fuel pressure is increased, atomization of the fuel spray is promoted and a reaching distance of the fuel spray becomes longer, which shortens the mixture gas forming time period.

Next, the ignition timing applied in this embodiment is described. In this embodiment, in view of suppressing production of smoke, the PCM 10 controls the ignition plug 25 to ignite at least at an ignition timing on the retarding side of the ignition timing on one of the graphs G2 and G3 (including the ignition timing on the one of the graphs G2 and G3) based on the fuel injection start timing according to the graph G1 and the used fuel pressure. Further, in view of securing the fuel consumption, when only the ignition timing is changed, the PCM 10 applies, as much as possible, a predetermined ignition timing with which a highest engine torque is obtained (hereinafter, simply referred to as "MBT"). In other words, the PCM 10 applies the MBT as much as possible to the extent that the smoke is not produced. Hereinafter, a case where the compression top dead center TDC is applied as the MBT is described as an example.

First, when the effective compression ratio is below CR1, the ignition timing with which smoke is not produced when the comparatively low fuel pressure is used (see the graph G2) is on the advancing side of the compression top dead center TDC which is the MBT. Thus, when the effective compression ratio is below CR1, it can be said that the compression top dead center TDC as the MBT can be achieved without causing smoke even when the comparatively low fuel pressure is used. Therefore, when the effective compression ratio is below CR1, the PCM 10 controls the fuel supply system 62 to set a comparatively low fuel pressure (e.g., 40 MPa), and controls the ignition plug 25 to ignite at the compression top dead center TDC as the MBT.

On the other hand, when the effective compression ratio is CR1 or higher, the ignition timing with which smoke is not produced when the comparatively low fuel pressure is used (see the graph G2) is on the retarding side of the compression top dead center TDC which is the MBT. Thus, when the comparatively low fuel pressure is used, with the effective compression ratio at CR1 or higher, it is difficult to achieve the compression top dead center TDC as the MBT without causing smoke. Whereas, within a range where the effective compression ratio is CR1 or higher but below CR2, the ignition timing with which smoke is not produced when the comparatively high fuel pressure is used (see the graph G3) is on the advancing side of the compression top dead center TDC which is the MBT. Thus, within this range of the effective compression ratio, it can be said that the compression top dead center TDC as the MBT can be achieved without causing smoke, by using the comparatively high fuel pressure. Therefore, within the range where the effective compression ratio is CR1 or higher but below CR2, the PCM 10 controls the fuel supply system 62 to set a comparatively high fuel pressure (e.g., 120 MPa), and controls the ignition plug 25 to ignite at the compression top dead center TDC as the MBT.

However, when the effective compression ratio is CR2 or higher, the ignition timing with which smoke is not produced when the comparatively high fuel pressure is used (see the graph G3) is on the retarding side of the compression top dead center TDC which is the MBT. Thus, when the effective compression ratio is CR2 or higher, it is difficult to achieve the compression top dead center TDC as the MBT without causing smoke. Therefore, when the effective compression ratio becomes CR2 or higher, the PCM 10 prioritizes the smoke suppression over the achievement of the compression top dead center TDC as the MBT, and controls the ignition plug 25 to apply the ignition timing on the graph G3 instead of the MBT. In other words, when the effective compression ratio becomes CR2 or higher, the PCM 10 retards the ignition timing according to the graph G3 from the compression top dead center TDC as the effective compression ratio increases, so as to surely suppress smoke.

Note that in this embodiment, the method of controlling the ignition timing based on the effective compression ratio is described for the sake of convenience; however, the ignition timing may be controlled based on the fuel injection start timing according to the graph G1 that is applied according to the effective compression ratio. In this case, when the fuel injection start timing according to the graph G1 is on the advancing side of a predetermined timing Ti corresponding to the effective compression ratio CR2 described above (the fuel injection start timing corresponding to the effective compression ratio CR2 on the graph G1), the PCM 10 controls the fuel supply system 62 to adjust the fuel pressure and controls the ignition plug 25 to ignite at the compression top dead TDC as the MBT. Specifically, as the effective compression ratio increases (i.e., as the engine load increases), the PCM 10 controls the fuel supply system 62 to increase the fuel pressure and controls the ignition plug 25 to ignite at the compression top dead center TDC as the MBT, so as to suitably achieve the compression top dead center TDC as the MBT without causing smoke. On the other hand, when the fuel injection start timing according to the graph G1 is on the retarding side of the predetermined timing T1, the PCM 10 prioritizes the smoke suppression over the achievement of the compression top dead center TDC as the MBT, and controls the ignition plug 25 to retard the ignition timing according to the graph G3 based on the retarding amount of the fuel injection start timing from the predetermined timing T1.

Moreover, in this embodiment, the example in which the compression top dead center TDC is applied as the MBT is described; however, the MBT is not limited to the compression top dead center TDC. For example, an ignition timing slightly retarded from the compression top dead center TDC may be applied as the MBT.

Further in another example, instead of such an MBT, an ignition timing defined in view of suppressing knocking (hereinafter, referred to as the "knocking restriction ignition timing") may be applied. Such an ignition timing is indicated by a graph G4 in FIG. 5. The knocking restriction ignition timing corresponds to a boundary defined so that knocking may occur when the ignition is performed on the advancing side of the knocking restriction ignition timing and knocking does not occur when the ignition is performed on the retarding side of the knocking restriction ignition timing.

When such a knocking restriction ignition timing is used, the PCM 10 applies the knocking restriction ignition timing as much as possible to the extent that smoke is not produced. As illustrated in FIG. 5, a highest effective compression ratio with which the knocking restriction ignition timing can be achieved without causing smoke is CR3 (corresponding to CR2 in the above case), and the fuel injection start timing corresponding to the effective compression ratio CR3, in other words, the fuel injection start timing on the graph G1 corresponding to the effective compression ratio CR3, is T2 (corresponding to the predetermined timing T1 in the above case, and hereinafter, referred to as the "predetermined timing T2").

When the fuel injection start timing according to the graph G1 is on the advancing side of the predetermined timing T2, the PCM 10 controls the fuel supply system 62 to adjust the fuel pressure, and controls the ignition plug 25 to ignite at the knocking restriction ignition timing. Specifically, the PCM 10 controls the fuel supply system 62 to increase the fuel pressure as the effective compression ratio increases (i.e., as the engine load increases) and controls the ignition plug 25 to ignite at the knocking restriction ignition timing, so as to suitably achieve the knocking restriction ignition timing without causing smoke. On the other hand, when the fuel injection start timing according to the graph G1 reaches the retarding side of the predetermined timing T2, to prioritize the smoke suppression, the PCM 10 controls the ignition plug 25 to apply the ignition timing on the graph G3 instead of the knocking restriction ignition timing. In other words, the PCM 10 retards the ignition timing according to the graph G3 based on the retarding amount of the fuel injection start timing from the predetermined timing T2.

Note that in this embodiment, the ignition timing is controlled by using the two fuel pressures (see the graphs G2 and G3 in FIG. 5), in other words, the fuel pressure is switched between the two levels by the fuel supply system 62; however, it is not limited to this, and the ignition timing may be controlled by switching the fuel pressure among three or more levels or smoothly varying the fuel pressure. In this case, a larger number of graphs corresponding to the graphs G2 and G3 illustrated in FIG. 5 are used. Further, the fuel pressure is not limited to be controlled between 40 MPa and 120 MPa, and the fuel pressure may be controlled to be below 40 MPa or above 120 MPa.

Next, operations and effects of the control device of the engine according to this embodiment are described.

According to this embodiment, to suppress pre-ignition, the PCM 10 retards the fuel injection start timing as the effective compression ratio increases so as to shorten the time period from the fuel injection start timing to the compression top dead center TDC, and when the fuel injection start timing reaches the retarding side of one of the predetermined timings T1 and T2, to prioritize the smoke suppression, the PCM 10 retards the ignition timing based on the retarding amount from the one of the predetermined timings T1 and T2. Thus, pre-ignition and smoke can both surely be suppressed.

Moreover, according to this embodiment, the PCM 10 sets the ignition timing based on the mixture gas forming time period from the fuel injection by the fuel injector 67 until the mixture gas including the injected fuel reaches the ignition plug 25 via the cavity 141 of the piston 14. Thus, the suitable mixing performance of the mixture gas inside the combustion chamber can be secured, and the smoke can effectively be suppressed.

Furthermore, according to this embodiment, when the fuel injection start timing is on the advancing side of one of the predetermined timings T1 and T2, the fuel pressure is increased as the engine load increases, and MBT is applied as the ignition timing. Thus, a suitable fuel consumption can be secured.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the

LIST OF REFERENCE CHARACTERS

1 Engine
10 PCM
14 Piston
141 Cavity
25 Ignition Plug
62 Fuel Supply System
67 Fuel Injector

What is claimed is:

1. A control device of an engine operated at a high compression ratio, a geometric compression ratio of the engine being 14:1 or higher, and the control device comprising:
    a fuel injection controller for controlling a fuel injector of the engine to start a fuel injection in a latter half of a compression stroke within an engine operating range where an engine speed is below a predetermined value and an engine load is above a predetermined value; and
    an ignition controller for controlling an ignition plug of the engine to retard an ignition timing when a timing for the fuel injection controller to start the fuel injection is on a retarding side of a predetermined timing, the ignition timing being retarded based on a retarding amount of the fuel injection start timing from the predetermined timing.

2. The control device of claim 1, wherein the fuel injection controller retards the fuel injection start timing as an effective compression ratio increases, so as to shorten a period of time from the start of the fuel injection to a top dead center on the compression stroke.

3. The control device of claim 1, wherein when the fuel injection start timing of the fuel injection controller is on the retarding side of the predetermined timing, the ignition controller sets the ignition timing based on the fuel injection start timing of the fuel injection controller and a mixture gas forming period of time from the fuel injection by the fuel injector until a mixture gas is formed around the ignition plug.

4. The control device of claim 3, wherein the engine has a piston formed with a downward cavity at a top part, and the fuel injector injects the fuel toward the cavity of the piston, and
    wherein the mixture gas forming time period is defined based on a period of time from the fuel injection by the fuel injector until the mixture gas including the injected fuel reaches the ignition plug via the cavity.

5. The control device of claim 1, further comprising a fuel pressure controller for increasing a pressure of the fuel as the engine load increases, so as to apply, as the ignition timing of the ignition controller, a predetermined ignition timing with which a highest engine torque is obtained, when the fuel injection start timing of the fuel injection controller is on an advancing side of the predetermined timing and only the ignition timing is changed.

6. The control device of claim 1, wherein the fuel injection controller sets the fuel injection start timing to avoid pre-ignition in which mixture gas self-ignites before a normal combustion start timing triggered by spark ignition.

* * * * *